US006994102B2

(12) United States Patent
Yamaguchi et al.

(10) Patent No.: US 6,994,102 B2
(45) Date of Patent: Feb. 7, 2006

(54) PRESSURE REGULATING VALVE

(75) Inventors: Kunihiro Yamaguchi, Aichi (JP);
Koichi Tamura, Aichi (JP); Akinori Araki, Aichi (JP); Yasushi Nagai, Aichi (JP)

(73) Assignee: JATCO LTD, Fuji (JP)

( * ) Notice: Subject to any disclaimer, the term of this patent is extended or adjusted under 35 U.S.C. 154(b) by 267 days.

(21) Appl. No.: 10/695,653

(22) Filed: Oct. 29, 2003

(65) Prior Publication Data

US 2004/0138025 A1 Jul. 15, 2004

(30) Foreign Application Priority Data

Oct. 30, 2002 (JP) .............................. 2002-316656

(51) Int. Cl.
*G05D 11/00* (2006.01)
(52) U.S. Cl. .............................. 137/115.13; 137/115.22; 137/467.5; 137/468
(58) Field of Classification Search ........... 137/115.13, 137/115.22, 467.5, 468
See application file for complete search history.

(56) References Cited

U.S. PATENT DOCUMENTS 3,033,221 A * 5/1962 Strader ........................ 137/101
3,067,689 A * 12/1962 Hause ........................ 417/288
3,618,628 A * 11/1971 Kramer ........................ 137/71
4,126,993 A * 11/1978 Grattapaglia et al. .......... 60/329
4,440,191 A * 4/1984 Hansen ........................ 137/468
5,156,332 A * 10/1992 Dyer ............................ 236/87
5,762,134 A * 6/1998 Droste et al. ................ 165/284
5,782,260 A * 7/1998 Jacobs et al. .......... 137/118.02
6,170,508 B1 * 1/2001 Faust et al. .................... 137/12

FOREIGN PATENT DOCUMENTS

JP 5-164223 A 6/1993

* cited by examiner

*Primary Examiner*—Frederick Nicolas
*Assistant Examiner*—Craig Schneider
(74) *Attorney, Agent, or Firm*—Foley & Lardner LLP

(57) ABSTRACT

A pressure regulating valve which is comprised of a valve body being comprised of a cylinder, a spool slidably disposed in the cylinder with a clearance, the spool and the cylinder defining a pressure chamber and a space portion, and an urging member which urges the spool in a direction opposite to a direction of a force applied to the spool by fluid pressure in the pressure chamber. A supply passage fluidly communicates the cylinder and a fluid pressure supply source, and a drain passage fluidly communicates the cylinder and a sump. A through-passage formed in the spool fluidly communicates the pressure chamber and the space portion. An orifice disposed between the space portion and a sump limits a flow rate of fluid drained from the space portion to the sump. The spool is made of material having a lower thermal expansion coefficient than material of the valve body.

16 Claims, 2 Drawing Sheets

PRESSURE REGULATING VALVE

BACKGROUND OF THE INVENTION

The present invention relates to a pressure regulating valve used for regulating fluid pressure delivered to hydraulic devices such that the fluid pressure is maintained at a preset target value. This invention is applicable particularly, but not exclusively, to a vehicle automatic transmission.

Pressure regulating valves have been used in hydraulic circuits to maintain hydraulic pressure at a constant pressure. Japanese Patent Provisional Publication (Heisei) 5-164223 discloses a pressure regulating valve which is shown in FIG. 2. According to the related art reference, a pressure regulating valve 100 comprises a spool 100b, and as shown by the top half of spool 100b in FIG. 2, under a low pressure condition, spool 100b is at a leftmost position within regulating valve 100 according to FIG. 2. When spool 100b is at this leftmost position, a drain port 100f is closed and therefore fluid is not drained, and also, an input port 100c and an output port 100d are in hydraulic communication and therefore fluid from a passage 111 is supplied to a passage 112. Output port 100d is in hydraulic communication with port 100e via passage 112 and a passage 113, and output pressure thereof is delivered via an orifice 114 to a pressure-receiving face of spool 100b. Accordingly, output pressure causes spool 100b to slide to the right according to FIG. 2 against the force of a spring 100a, and when the pressure becomes higher than is necessary, passage 112 (outport 100d) and passage 111 (input port 100c) are closed off as shown by the bottom half of spool 100b in FIG. 2, output port 100d is brought into hydraulic communication with drain port 100f. Thus, fluid pressure of passage 112 is relieved, and the drop in pressure is fed back to port 100e, resulting in spool 100b being pushed back to the left of FIG. 2 by spring 100a. Input port 100c and output port 100d are then once again in hydraulic communication, after which pressure of passage 112 is increased.

Pressure regulating valve 100 regulates the output pressure of passage 112 by the urging force of spring 100a by repetition of the above explained stroke movement of spool 100b. However, the pressure (fluid pressure) is not constant but instead pulsating, as the pressure is output by a pump. When the pulsation (fluid pressure fluctuation) and a natural frequency of vibration of spool 100a coincide, there are instances of self-induced vibration (resonance) occurring.

In order to suppress such resonance of spool 100b, orifice 114 is disposed in port 100e as shown in FIG. 2. That is, the flow rate of fluid fed back from passage 112 to port 100e is regulated, and resonance of spool 100b is regulated or dampened.

Also, in order to achieve an increased damping effect for pressure regulating valve 100, a pressure chamber 121 which is open to the air and where fluid enters and leaves by sliding motion of spool 100b is formed, and an orifice 124 is disposed as a restricting element in a passage 123 which is in hydraulic communication with pressure chamber 121. That is, by provision of orifice 124 to restrict the flow of fluid which is caused to flow out of and into pressure chamber 121 by the sliding movement of spool 100b, a damping effect is produced as a counter to vibration of spool 100b.

SUMMARY OF THE INVENTION

However, the temperature of fluid used in a hydraulic circuit is made to rise due to agitation of revolving elements which are connected to the hydraulic circuit, such as a torque converter of an automatic transmission, and viscosity of the fluid decreases. In such an instance, leakage of fluid occurs at seal portions of hydraulic devices, and an undesirable drop in fluid pressure being delivered to the hydraulic devices occurs. Further, depending on the hydraulic device (e.g., oil cooler), supplied pressure needs to be suppressed when fluid temperature is low and raised the higher the fluid temperature becomes.

A conceivable solution is to implement a means to control fluid pressure which is output from an oil pump such that the pressure is increased when fluid temperature in the hydraulic circuit increases. However, this results in a decrease in fuel efficiency of an engine used to drive the oil pump. Moreover, detecting the fluid temperature, as part of a process for controlling the fluid pressure output from the oil pump, additionally requires that a fluid temperature sensor be installed, resulting in an increase in the number of parts and therefore an increase in costs.

And while resonance of pressure regulating valve 100 is suppressed according to the related art, pressure regulation (temperature compensation) necessitated by a rise in fluid temperature is not effectively dealt with. Accordingly, it is desirable for a pressure regulating valve to have a simple structure, and to suppress undesirable decreases in pressure of fluid which is being supplied to hydraulic devices when the temperature of fluid has risen to a high temperature as well as increase supplied fluid pressure when necessary.

It is therefore an object of the present invention to provide a pressure regulating valve which has a simple structure, and which is capable of securely stabilizing the pressure of fluid regardless of the temperature of the fluid, as well as increase supplied fluid pressure when necessary, and which suppresses self-induced vibration of a spool.

An aspect of the present invention resides in a pressure regulating valve for regulating a pressure of fluid to be outputted from the pressure regulating valve, the pressure regulating valve comprising a valve body having a cylinder, a supply passage which fluidly communicates the cylinder and a fluid pressure supply source, and a drain passage which fluidly communicates the cylinder and a sump, a spool slidably disposed in the cylinder with a clearance, the spool being made of a material having a lower thermal expansion coefficient than a material of the valve body, the spool and the cylinder defining a pressure chamber and a space portion, an urging member disposed in the space portion to urge the spool in a direction opposite to a direction of a force applied to the spool by fluid pressure in the pressure chamber, a through-passage formed in the spool so as to fluidly communicate the pressure chamber and the space portion, and an orifice disposed between the space portion and a sump to limit a flow rate of fluid drained from the space portion to the sump.

Another aspect of the present invention resides in a pressure regulating valve comprising a valve body, a bore formed in the valve body, the bore comprising a space portion, a first pressure chamber, and a second pressure chamber, a spool which is slidably inserted within the bore, a diameter of an inner circumference of the bore being greater than a diameter of an outer circumference of the spool so as to form a clearance, the first pressure chamber thereby being in hydraulic communication with the space portion, a material of the spool having a lower thermal expansion coefficient than a material of the valve body, a supply passage through which hydraulic pressure is supplied to the first pressure chamber from a pressure supply source, a drain passage through which hydraulic pressure is drainable from the first pressure chamber, a through-passage which is formed in the spool and through which the space portion and the pressure chamber are in hydraulic communication, and an urging member which is disposed in the space portion to apply an urging force to the spool, hydraulic pressure in the second pressure chamber pushing the spool to allow hydraulic pressure to drain when hydraulic pressure in the first pressure chamber has risen above a target hydraulic pressure, draining continuing until an equilibrium is reached between the urging force of the urging member and an opposing urging force of hydraulic pressure in the second pressure chamber.

A further aspect of the present invention resides in a pressure regulator valve of an automatic transmission, the pressure regulator valve comprising a valve body which comprises a cylinder, a supply passage which hydraulically connects the cylinder and a pressure supply source, a drain passage which hydraulically connects the cylinder and a sump, and an inflow-outflow passage which hydraulically connects the cylinder and the sump, a spool which is slidably inserted within the cylinder, the spool dividing the cylinder into at least one space portion connected to the inflow-outflow passage, a first pressure chamber receiving pressure from the supply passage, and a second pressure chamber receiving pressure from the supply passage, a material of the spool having a lower thermal expansion coefficient than a material of the valve body, restricting means for restricting the flow rate of the inflow-outflow passage, urging means for applying an urging force on the spool in a direction opposed to an urging force of the second pressure chamber, a clearance through which fluid flows from the first pressure chamber into the space portion, and a through-passage through which fluid flows from the first pressure chamber into the space portion, the through-passage being formed in the spool, the spool sliding to allow excess pressure to drain when hydraulic pressure of the second pressure chamber overcomes the urging force of the urging means, a flow rate of the restricting means being less than a combined flow rate of the through-passage and the clearance under a low temperature condition, a flow rate of the restricting means being more than a combined flow rate of the through-passage and the clearance under a high temperature condition.

DETAILED DESCRIPTION OF THE INVENTION

Figure 1:
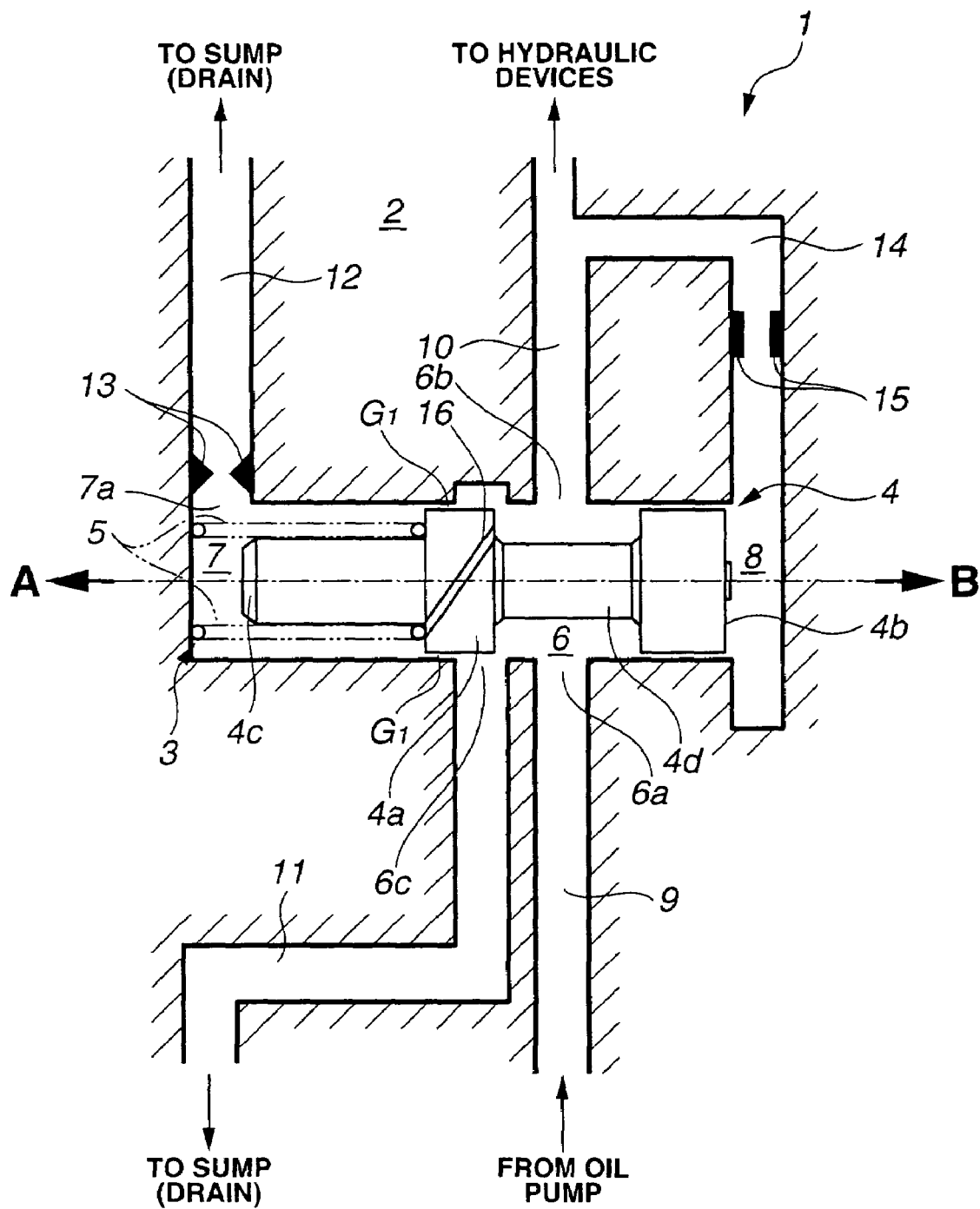
FIG. 1 is a cross-sectional view of a pressure regulating valve according to an embodiment of the present invention.
Figure 2:
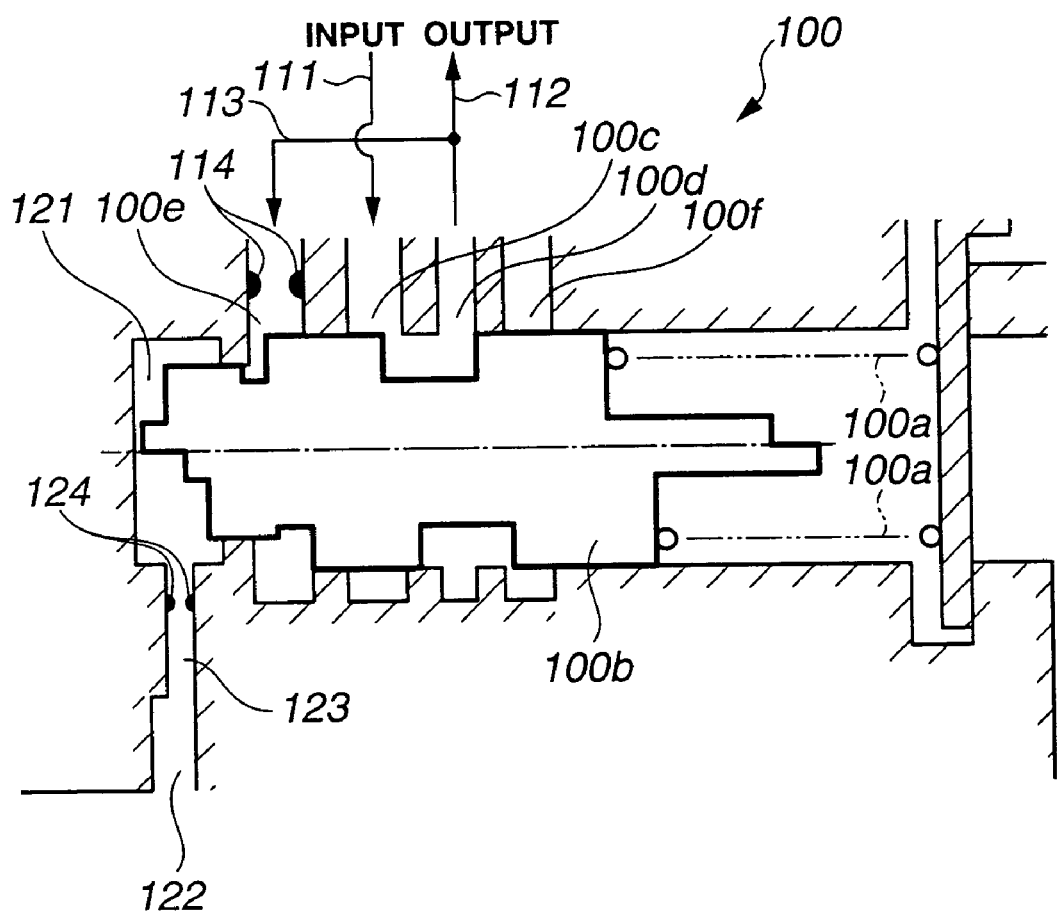
FIG. 2 is a cross-sectional view of a pressure regulating valve according to the related art.

Referring to FIG. 1, there is discussed an embodiment of a pressure regulating valve in accordance with the present invention.

A pressure regulating valve 1 mostly comprises an aluminum valve body 2, a cylinder 3 which is cylindrically formed within valve body 2, a steel spool 4 which is slidably inserted inside cylinder 3, and a spring 5 as an urging member which urges spool 4 in a direction indicated by arrow B in FIG. 1. Pressure regulating valve 1 is used as a pressure regulator in a hydraulic circuit of an automatic transmission.

Spool 4 is disposed within cylinder 3 to be slidable in both the direction indicated by arrow B and a direction indicated by arrow A in FIG. 1. Spool 4 comprises a first land 4a and a second land 4b which are formed as large diameter portions of spool 4 respectively at a substantial center portion axially of spool 4 and at one end of spool 4. First land 4a and second land 4b are cylindrical and of the same diameter. An end portion 4c projects from first land 4a in the direction indicated by arrow A, end portion 4c having a diameter smaller than that of first land 4a. First land 4a and second land 4b are connected by a middle portion 4d which has a diameter the same as that of end portion 4c. First land 4a and second land 4b divide or section cylinder 3 into a first pressure chamber 6, a space portion 7, and a second pressure chamber 8.

First pressure chamber 6 comprises an inlet port 6a, an outlet port 6b, and a regulating port 6c. Inlet port 6a is connected to an end of a supply passage 9, another end of supply passage 9 being connected to an oil pump (not shown) which serves as a fluid pressure supply source. Fluid pressure is thus supplied from the oil pump through supply passage 9 to pressure chamber 6. Outlet port 6b is connected to an outlet passage 10 through which fluid which has been input from inlet port 6a is output to hydraulic devices such as a hydraulically operated clutch and an oil cooler (not shown) after having been regulated. Regulating port 6c is connected to one end of a drain passage 11, another end of drain passage 11 being connected to a sump (not shown). Fluid inside first pressure chamber 6 is thus drained to the sump through drain passage 11 when fluid pressure inside first pressure chamber 6 (the same as pressure of supply passage 9 and outlet passage 10) rises beyond a target pressure value. Also, fluid pressure within outlet passage 10 is supplied to second pressure chamber 8 by being fed back through a branch passage 14 so as to apply an urging force on spool 4 opposite to the urging force of spring 5. When the pressure in second pressure chamber 8 builds up to a point where the urging force of spring 5 is overcome, spool 4 is urged to slide in the direction of arrow A in FIG. 1 against the urging force of spring 5.

Excess pressure inside first pressure chamber 6 is then appropriately drained through drain passage 11 until a balance is reached between fluid pressure of second pressure chamber 8 and the urging force of spring 5. When this balance is reached, fluid pressure inside first pressure chamber 6 (i.e., fluid pressure of supply passage 9 and outlet passage 10) becomes a target value, i.e., a target fluid pressure. Fluid pressure is thus regulated by pressure regulating valve 1. Further, spring 5 is disposed in space portion 7 which comprises a port 7a, an inflow-outflow passage 12 being connected to port 7a. Space portion 7 is in hydraulic communication with a sump through inflow-outflow passage 12. Since valve body 2 is immersed within fluid contained in an oil pan (not shown) and space portion 7 and inflow-outflow passage 12 are thus filled with fluid, fluid within space portion 7 flows out inflow-outflow passage 12 when spool 4 slides in the direction of arrow A, and fluid within inflow-outflow passage 12 flows into space portion 7 when spool 4 slides in the direction of arrow B.

A first orifice 13 is disposed as a restricting member at port 7a, and functions to appropriately restrict the flow rate of fluid entering and exiting via port 7a, in order to suppress resonance of spool 4. A second orifice 15 is also formed within branch passage 14 which communicates with second pressure chamber 8 as a further counter for preventing resonance of spool 4.

A diameter of an inner circumference of cylinder 3 of valve body 2 is greater than a diameter of an outer circumference of first land 4a of spool 4 such that a minute clearance $G_1$ is formed therebetween to enable spool 4 to slide smoothly. A size of clearance $G_1$ becomes large under high temperature conditions where viscosity of fluid has decreased drastically, and becomes minute under low temperature conditions where viscosity of fluid has not decreased significantly. This is designed to be a naturally occurring result, since valve body 2 is made from aluminum and spool 4 is made from steel, the thermal expansion coefficient of steel being lower than that of aluminum. Thus, fluid inside of first pressure chamber 6 flows into space portion 7 by passing through clearance $G_1$ which changes size in response to fluid temperature.

A through-passage 16 is formed in first land 4a of spool 4 to allow first pressure chamber 6 to communicate with space portion 7, so as to actively allow fluid inside of first pressure chamber 6 to flow into space portion 7. Given a flow rate $F_{TP}$ per unit of time of through-passage 16, $F_{G1}$ of clearance $G_1$, and $F_{FO}$ of first orifice 13 respectively, flow rates $F_{TP}$, $F_{G1}$, and $F_{FO}$, where fluid temperature is low (approximately 100° C. or less), exist in a relationship where the following expression (1) is satisfied.

$$F_{FO} > F_{TP} + F_{G1} \tag{1}$$

Flow rates $F_{TP}$, $F_{G1}$, and $F_{FO}$, where fluid temperature is high (approximately 100° C. or more), exist in a relationship where the following expression (2) is satisfied.

$$F_{FO} < F_{TP} + F_{G1} \tag{2}$$

Further, first orifice 13 is also made from steel as is spool 4, thus any change in flow rate of first orifice 13 and through-passage 16 is extremely small compared with any change in flow rate of clearance $G_1$ accompanying a rise in fluid temperature. The reason for allowing fluid inside first pressure chamber 6 flow into space portion 7 with the aforementioned flow rate characteristics will herein be explained.

As the temperature of fluid inside the hydraulic circuit rises, there is a resultant decrease in fluid viscosity. The decreased viscosity allows fluid to leak from hydraulic devices as well as connecting portions existing between the hydraulic devices and hydraulic passages which receive fluid pressure from pressure regulating valve 1. This leakage then results in an undesirable drop in pressure which is being delivered to the hydraulic devices. Therefore, when fluid temperature is high (approximately 100° C. or more), it is necessary to compensate pressure which has dropped as a result of leakage. This is achieved by outputting fluid pressure which has a higher fluid pressure value than a normal target fluid pressure value, that is, by outputting a higher fluid pressure in response to a drop in pressure, than is required when there is an absence of such a drop. More specifically, pressure regulating valve 1 counters leakage occurring at points where fluid pressure is being delivered from pressure regulating valve 1 when fluid temperature is high by outputting fluid pressure which is higher than normal to outlet passage 10, in effect canceling out the leakage. As a result, appropriate fluid pressure which is required by the hydraulic devices is supplied, the pressure being substantially the same as when fluid temperature is low. Thus, stabilized fluid pressure characteristics for the hydraulic devices are achieved spanning from low fluid temperatures to high fluid temperatures.

Pressure regulating valve 1 according to the present invention is therefore designed such that fluid pressure (target fluid pressure) to be output from outlet port 6b of first pressure chamber 6 becomes greater than normal in response to a rise in temperature. More specifically, when fluid is at a low temperature (approximately 100° C. or less) where viscosity is not low enough for fluid leakage to occur in the hydraulic circuit, the flow rate from first pressure chamber 6 into space portion 7 is less than the flow rate of first orifice 13 as defined by expression (1). Fluid pressure is therefore not created inside space portion 7, and thus fluid pressure from outlet port 6b is regulated such that it is at an appropriate target value as required by the hydraulic devices.

Conversely, when fluid is at high temperature (approximately 100° C. or more) where viscosity is low enough for fluid leakage to occur in the hydraulic circuit, the flow rate from first pressure chamber 6 into space portion 7 is greater than the flow rate of first orifice 13 as defined by expression (2). Fluid pressure is therefore created inside space portion 7 and acts to supplement the urging force of spring 5, and thus fluid pressure from outlet port 6b is regulated such that it is at a higher pressure value than the previously mentioned appropriate target value.

To realize this kind of pressure regulating characteristic using general technical principles, design of special means which increases the spring force of spring 5 in response to fluid temperature is necessary, and thus the structure of a pressure regulating valve is complicated and costly. The present invention, however, provides a simple structure, and effectively compensates fluid pressure to counter pressure losses which accompany rises in fluid temperature. Another conceivable method to realize this kind of pressure regulating characteristic is to design clearance $G_1$ to become considerably wider in instances of low fluid temperature than has been designed to the present, however, if clearance $G_1$ is made extremely wide, it is possible that spool 4 will be inserted with an inclination inside cylinder 3 such that spool 4 will rattlingly slide within cylinder 3, making it difficult for spool 4 to slide smoothly inside of cylinder 3. Therefore, there is a limit to how large clearance $G_1$ can be. A further concept is to design first orifice 13 with an extremely small diameter to match the various size changes of clearance $G_1$ resulting from temperature changes. However, in instances of extremely low temperatures (e.g., approximately 0° C. or less), fluid viscosity is great and the flow of fluid out from space portion 7 is adversely inhibited, and therefore the basic function of the pressure regulating valve is lost. Therefore, according to the present invention, by disposing through-passage 16 in first land 4a, the amount of fluid being supplied to space portion 7, wherein spring 5 is disposed as an urging member, is increased.

Operation of a pressure regulating valve and effects gained therefrom will be herein explained. First, once fluid is input into first pressure chamber 6 and second pressure chamber 8 of pressure regulating valve 1 by an oil pump (not shown), fluid pressure inside second pressure chamber 8 urges spool 4 to slide in the direction of arrow A in FIG. 1. When fluid pressure of second pressure chamber 8 is less than the spring force of spring 5 which urges spool 4 in the direction of arrow B, spool 4 is not urged to slide, and communication between inlet port 6a and regulating port 6c of first pressure chamber 6 is interrupted or blocked off.

Conversely, when fluid pressure of second pressure chamber 8 builds up to become larger than the spring force of spring 5, spool 4 is forced or urged to slide in the direction of arrow A, and enables communication between inlet port 6a and regulating port 6c. Fluid of first pressure chamber 6 then drains to a sump via regulating port 6c, and fluid pressure of first pressure chamber 6 and second pressure chamber 8 decreases. Spool 4 consequently slides in the direction of arrow B accompanying this decrease in pressure, whereby the communication area of inlet port 6a and regulating port 6c is reduced and thus the volume of fluid which may travel therebetween is reduced. Spool 4 stops at a position where urging force created by fluid pressure of second pressure chamber 8 and urging force of spring 5 are in balance, i.e., reach equilibrium (where the communication area of inlet port 6a and regulating port 6c is at an appropriate value). In this manner, fluid pressure output from outlet port 6b to hydraulic devices is thus regulated and becomes a constant pressure.

The flow rate of fluid which flows into second pressure chamber 8 from branch passage 14 is restricted by second orifice 15, and therefore fluid pressure fluctuations of first pressure chamber 6 (supply passage 10) which originate, for example, from fluctuation (pulsation) of output pressure from an oil pump, are transmitted to second pressure chamber 8 in a state of being restricted by second orifice 15. Also, first orifice 13 provides a resistance to the flowing in and out of fluid to space portion 7 accompanying reciprocal sliding of spool 4, and produces a damping effect on resonance of spool 4.

According to pressure regulating valve 1 of the present invention, fluid pressure to be output from outlet port 6b of first pressure chamber 6 is designed to be higher than normal accompanying a rise in fluid temperature. That is, when fluid temperature is high, the flow rate of first orifice 13 will be less than the flow rate of fluid which flows into space portion 7 from first pressure chamber 6 through clearance $G_1$ and through-passage 16. And when fluid temperature is low, the flow rate of first orifice 13 will be more than the flow rate of fluid which flows into space portion 7 from first pressure chamber 6 through clearance $G_1$ and through-passage 16.

Thus, a pressure regulation characteristic is achieved wherein fluid pressure is created in space portion 7 when fluid temperature is high, and fluid pressure is not created in space portion 7 when fluid temperature is low. Accordingly, fluid pressure in space portion 7 is added to the spring force of spring 5 when fluid temperature is high, whereby fluid pressure of outlet passage 10 and other parts of the hydraulic circuit is regulated such that it is at a higher pressure than normal. Also, when fluid temperature is low, fluid pressure of the hydraulic circuit is regulated only by spring force of spring 5 such that is at a normal and appropriate fluid pressure.

Thus, according to the present invention, besides suppressing self-induced vibration, i.e., resonance, of spool 4, fluid is not only allowed but is actively made to flow with a greater flow rate accompanying a rise in fluid temperature from first pressure chamber 6 into space portion 7 in which spring 5 is disposed to urge spool 4, resulting in further pressure being added to the urging force provided by spring 5 being increased accompanying a rise in fluid temperature. Thus, pressure compensation to counter pressure loss within a hydraulic circuit accompanying a fluid temperature increase, as well as an active increase of pressure as needed to hydraulic devices is securely realized with a simple structure.

This application is based on a prior Japanese Patent Application No. 2002-316656. The entire contents of Japanese Patent Application No. 2002-316656 with a filing date of Oct. 30, 2002 are hereby incorporated by reference.

Although the invention has been described above by reference to a certain embodiment of the invention, the invention is not limited to the embodiment described above. Modifications and variations of the embodiment described above will occur to those skilled in the art in light of the above teachings. For example, through-passage 16 can alternatively be formed along an axial center of spool 4 to pass through a front end of end portion 4c and a rear end of second land 4b. Also, the materials used for valve body 2 and spool 4 can be any appropriately chosen materials provided that the thermal expansion coefficient of the material constituting spool 4 is lower than that of the material constituting valve body 2. And also, outlet passage 10 can be formed so as to branch off from of supply passage 9 (which is on a side of inlet port 6a from which fluid pressure is flowing), in which case outlet port 6b is not required as part of the structure. And also, besides finding application in an automatic transmission, the present invention is widely applicable to various hydraulic circuits in which loss of pressure occurs accompanying increases in fluid temperature. The scope of the invention is defined with reference to the following claims.

What is claimed is:

1. A pressure regulating valve for regulating a pressure of fluid to be outputted from the pressure regulating valve, the pressure regulating valve comprising:
   a valve body having a cylinder, a supply passage which fluidly communicates the cylinder and a fluid pressure supply source, and a drain passage which fluidly communicates the cylinder and a sump;
   a spool slidably disposed in the cylinder with a clearance, the spool being made of a material having a lower thermal expansion coefficient than that of a material of the valve body, the spool and the cylinder defining a pressure chamber and a space portion;
   an urging member disposed in the space portion to urge the spool in a direction opposite to a direction of a force applied to the spool by fluid pressure in the pressure chamber;
   a through-passage formed in the spool so as to fluidly communicate the pressure chamber and the space portion; and
   an orifice disposed between the space portion and a sump to limit a flow rate of fluid drained from the space portion to the sump.

2. The pressure regulating valve as claimed in claim 1, wherein a flow rate of fluid, which flows from the pressure chamber to the space portion through the clearance and the through-passage, increases according to the increase of a temperature of the fluid.

3. The pressure regulating valve as claimed in claim 2, wherein the clearance is increased according to the increase of the fluid temperature.

4. The pressure regulating valve as claimed in claim 1, wherein a port of the supply passage to the pressure chamber is always fully open, and the spool intermittently closes a port of the drain passage to the pressure chamber.

5. The pressure regulating valve as claimed in claim 1, wherein
   a flow rate of fluid flowing from the pressure chamber to the space portion is less than a flow rate of the orifice when under a low temperature condition,
   a flow rate of fluid flowing from the pressure chamber to the space portion is more than a flow rate of the orifice when under a high temperature condition.

6. The pressure regulating valve as claimed in claim 1, wherein
   an amount of fluid flowing from the clearance and the through-passage into the space portion is less than an amount of fluid flowing through the orifice when fluid temperature is low, an amount of fluid flowing from the clearance and the through-passage into the space portion is more than an amount of fluid flowing through the orifice when fluid temperature is high.

7. The pressure regulating valve as claimed in claim 1, wherein the spool comprises a plurality of lands, the through-passage being formed in a land of the spool.

8. The pressure regulating valve as claimed in claim 3, wherein the spool and the orifice are made of steel, and the valve body is made of aluminum.

9. The pressure regulating valve as claimed in claim 1, wherein the clearance is formed between an inner circumference of the cylinder and an outer circumference of the spool.

10. The pressure regulating valve as claimed in claim 7, wherein the clearance is formed between the inner circumference of the cylinder and an outer circumference of the land in which the through-passage is formed.

11. The pressure regulating valve as claimed in claim 1, wherein fluid pressure from the supply passage is fed back to urge the spool in one direction via a branch passage, the branch passage comprising an orifice.

12. The pressure regulating valve as claimed in claim 1, wherein a flow rate $F_T$ of the through-passage, a flow rate $F_C$ of the clearance, and a flow rate $F_O$ of the orifice exist in a relationship under a lower temperature condition where the expression $F_O>F_T+F_C$ is satisfied, and exist in a relationship under a higher temperature condition where the expression $F_O<F_T+F_C$ is satisfied.

13. The pressure regulating valve as claimed in claim 1, wherein the spool is forced to slide and unblock the drain passage when fluid pressure of the pressure chamber has risen above a preset target value, thereby maintaining fluid pressure of the pressure chamber at the target value.

14. A pressure regulating valve comprising:
   a valve body;
   a bore formed in the valve body, the bore comprising a space portion, a first pressure chamber, and a second pressure chamber;
   a spool which is slidably inserted within the bore, a diameter of an inner circumference of the bore being greater than a diameter of an outer circumference of the spool so as to form a clearance, the first pressure chamber thereby being in hydraulic communication with the space portion, a material of the spool having a lower thermal expansion coefficient than a material of the valve body;
   a supply passage through which hydraulic pressure is supplied to the first pressure chamber from a pressure supply source;
   a drain passage through which hydraulic pressure is drainable from the first pressure chamber;
   a through-passage being formed in the spool through which the space portion and the first pressure chamber are in hydraulic communication; and
   an urging member which is disposed in the space portion to apply an urging force to the spool;
   wherein hydraulic pressure in the second pressure chamber pushes the spool to allow draining of hydraulic pressure when hydraulic pressure in the first pressure chamber has risen above a target hydraulic pressure, the draining continuing until an equilibrium is reached between the urging force of the urging member and an opposing urging force of hydraulic pressure in the second pressure chamber.

15. The pressure regulating valve as claimed in claim 14, wherein the spool comprises a plurality of large diameter portions, the through-passage being formed in a large diameter portion which is disposed between the space portion and the first pressure chamber.

16. A pressure regulator valve of an automatic transmission, the pressure regulator valve comprising:
   a valve body which comprises
      a cylinder,
      a supply passage which hydraulically connects the cylinder and a pressure supply source,
      a drain passage which hydraulically connects the cylinder and a sump, and
      an inflow-outflow passage which hydraulically connects the cylinder and the sump;
   a spool which is slidably inserted within the cylinder, the spool dividing the cylinder into at least one space portion hydraulically connected to the inflow-outflow passage, a first pressure chamber receiving pressure from the supply passage, and a second pressure chamber receiving pressure from the supply passage, a material of the spool having a lower thermal expansion coefficient than a material of the valve body;
   urging means for applying an urging force on the spool in a direction opposed to an urging force of the second pressure chamber, the spool sliding to allow excess pressure to drain when hydraulic pressure of the second pressure chamber overcomes the urging force of the urging means;
   a clearance through which fluid flows from the first pressure chamber into the space portion;
   a through-passage through which fluid flows from the first pressure chamber into the space portion, the through-passage being formed in the spool; and
   restricting means for restricting the flow rate of the inflow-outflow passage,
   the flow rate of the restricting means being less than a combined flow rate of the through-passage and the clearance under a low temperature condition,
   the flow rate of the restricting means being more than a combined flow rate of the through-passage and the clearance under a high temperature condition.

* * * * *